United States Patent Office 3,314,307
Patented Apr. 18, 1967

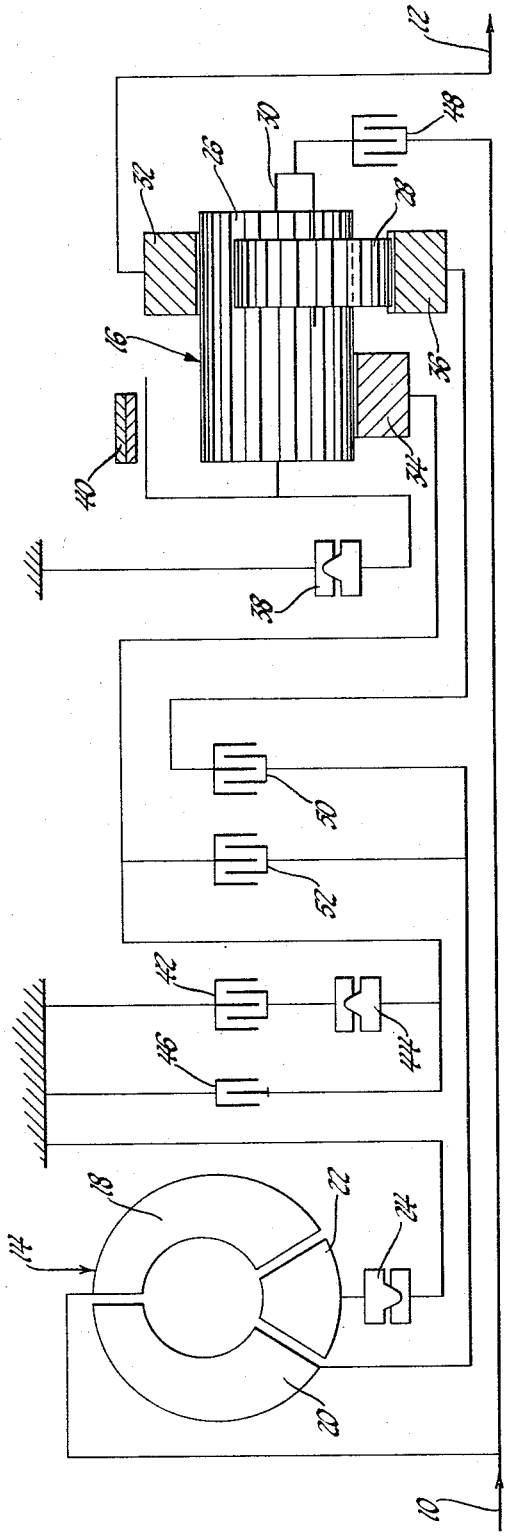

3,314,307
TRANSMISSION
Earl L. Egbert, Northville, Mich., assignor to General Motors Corporation, Detroit, Mich., a corporation of Delaware
Filed Dec. 5, 1963, Ser. No. 328,254
4 Claims. (Cl. 74—688)

This invention relates to improvements in transmissions adapted for use, although not exclusively, with motor vehicles.

There are many requirements of an automatic vehicle transmission, and perhaps foremost of these requirements are simplicity and size. One way to meet both requirements is by using fewer gears. In an effort to use fewer gears but still afford the same number of gear ratios, the gearing invariably becomes very complicated. This, in turn, produces noise and wear problems. Accordingly, a transmission is now proposed that with a minimum of gears, affords a maximum number of drive ratios within an acceptable drive range. This is achieved without resorting to complexity or without comprising the efficiency and further facilitates ratio changes that require a minimum number of transmission actions. Moreover, the transmission provides a unique arrangement of the gearing that does not require gear compounding and that by a novel scheme permits various of the gears to assume dual functions.

Additionally, the invention comtemplates a transmission that affords a split torque direct drive, part of the drive being mechanical and the other part via a hydrodynamic torque transmitting device, and an overdrive that is completely mechanical without any of the drive being through the hydrodynamic torque transmitting device.

The foregoing and other objects and advantages of the invention will be apparent from the following description and the accompanying drawing in which the single figure shows a schematic diagram of a transmission incorporating the principles of the invention.

Referring to the drawing in detail, the numerals 10 and 12 denotes, respectively, driving and driven shafts 10 and 12. Assuming that the transmission is to be used in a motor vehicle, the driving shaft 10 will be joined to the usual engine and the driven shaft 12 by a rear axle, not shown, to the vehicle wheels. Drivingly interposed between the shafts 10 and 12 are a hydrodynamic torque transmitting device, such as a torque converter 14, and gearing denoted generally at 16. As will become more apparent the torque converter 14 and the gearing 16 combine to provide four forward drive ratios and one reverse drive ratio.

The torque converter 14 may be of any suitable construction and comprises an impeller 18, a turbine 20, and a stator 22. The stator 22 is prevented from backward rotation by a one-way device 24 of known construction employing sprags, rollers or other type one-way elements for preventing relative rotation between two races. In a way well known, fluid is circulated by the impeller 18 through the turbine 20 and the stator 22 and back to the impeller 18, thus multiplying the torque supplied to the impeller 18 by whatever the torque multiplication ratio is of the torque converter 14. At a certain selected speed, the torque converter 14 achieves the coupling point and thereafter functions as a fluid coupling with the impeller 18, and the turbine 20, and the stator 22 all revolving substantially together.

The gearing 16 is of the planetary type and comprises one or more elongated planet pinions 26 and one or more short pinions 28, all revolvably supported upon a planet carrier 30 and in intermeshing relation. Meshing with the elongated pinions 26 are an output ring gear 32, which is jointed to the driving shaft 12, and a reaction sun gear 34. The gearing 16 is completed by an input sun gear 36 that meshes with the short planet pinions 28.

Several drive sustaining devices, such as brakes and clutches, are employed for controlling the gearing 16 so as to provide the aforementioned drive rations. These brakes and clutches where appropriate may be mechanically, electrically or hydraulically operated in any known way. Moreover, the brakes and clutches may be of any usual form. For example, the brakes may employ bands, disks, cones, etc. and the clutches disks, cones, etc. Among the brakes are a one-way brake 38, similar to the one-way device 24, for preventing backward rotation only of the planet carrier 30, and a reverse brake 40 of the band type for preventing rotation of the planet carrier 30 in either direction. The reaction sun gear 34 is prevented from revolving backwards by a forward brake 42 and a one-way brake 44. An overdrive brake 46 prevents rotation of the reaction sun gear 34 in either direction. The reverse brake 40 and the overdrive brake 46 can, as will be explained, serve also as overrun brakes.

The clutches include a direct drive clutch 48 between the planet carrier 30 and the driving shaft 10, a forward drive clutch 50 between the input sun gear 36 and the torque converter turbine 20, and a reverse drive clutch 52 between the reaction sun gear 34 and the turbine 20.

As has been mentioned, operationally the transmission provides four forward drive ratios and a reverse. Neutral is achieved by releasing all of the clutches and brakes.

To initiate forward drive in the lowest or first speed ratio, the forward drive clutch 50 is engaged. Drive will therefore be to the input sun gear 36 in a forward direction. The sun gear 36 will then revolve the short pinions 28 backward and the elongated planet pinions 26 forward. Since backward rotation of the planet carrier 30 is prevented by the one-way brake 38, the ring gear 32 is also driven forwardly and accordingly the driven shaft 12, but at a reduced speed compared to the speed at which the input sun gear 36 is driven. This represents the lowest speed drive or the speed with the greatest torque multiplication. The over-all torque multiplication, of course, will be that obtained from both the gearing 16 and the torque converter 14.

If there is to be considerable driving in this low speed, the reverse brake 40 can be engaged to prevent the carrier 30 from revolving forwardly and hence avoid a free wheeling condition during overrun. This free wheeling condition would, as mentioned, result when the driven shaft 12 became the driver. When this occurs, the one-way device 38 would release and, hence, the connection to the vehicle engine would be broken and no braking from the engine would be possible.

To obtain the intermediate or second speed ratio, it is only necessary to engage the forward drive brake 42 so that the reaction sun gear 34 is prevented from revolving backwards. This assumes that the reverse brake 40 is not engaged. Drive continues to be transferred from the torque converter 14 to the input sun gear 36, but now the planet carrier 30 is caused to revolve forwardly and carry therewith the output ring gear 32. This forward rotation of the planet carrier 30 is permitted by the one-way device 38. Consequently, the driven shaft 12 is revolved at a slightly faster speed than in the low speed ratio. Again, if there is to be sustained driving at this intermediate speed, provision can be made for engaging the overdrive brake 46 so as to insure against the free wheeling condition discussed with respect to low speed.

The direct drive or third speed ratio still only requires one action, and that is the engagement of the direct drive clutch 48. With the forward drive clutch 50 still engaged, the input sun gear 36 will continue to receive its drive from the torque converter 14 via the turbine 20, whereas the direct drive clutch 48 will transfer drive directly from the driving shaft 10 to the planet carrier 30. With the input sun gear 36 revolving at substantially the same speed as the driving shaft 10, except for a slight fluid slippage through the torque converter 14, and with the planet carrier 30 being driven at actual driving shaft speed, the gearing 16 is for all practical purposes locked-up. Hence, the driven shaft 12 will be rotated at substantially the same speed as the driving shaft 10. It is to be noted here that only a part of the drive is transferred through the torque converter 14 and therefore is subject to the fluid losses in the converter 14. The other part of the drive is transferred through the mechanical connection furnished by the direct drive clutch 48. Consequently, fluid losses are minimized and the transmission is more efficient in direct drive, which is normally a ratio of maximum usage in automobiles. In this direct drive ratio both of the one-way brakes 38 and 44 automatically release, assuming, of course, the brakes 40 and 46 are released.

The fourth drive ratio, an overdrive, is obtained by engaging the overdrive brake 46 and disengaging the forward drive clutch 50. The direct drive clutch 48 is still engaged so as to transfer drive directly from the driving shaft 10 to the planet carrier 30. With the reaction sun gear 34 held against rotation, a simple overdrive is achieved with the output ring gear 32 and, accordingly, the driving shaft 12 being revolved faster than the driving shaft 10. The one-way brake 44 is in effect bypassed in the overdrive ratio, whereas the one-way brake 38, which only prevents backward rotation of the carrier 30, continues to be released.

Reverse drive requires that the reverse brake 40 and the reverse drive clutch 52 both be engaged. Drive is therefore from the torque converter turbine 20, through the reverse drive clutch 52 and to the reaction sun gear 34. The elongated pinion 26 is revolved backwards and carries therewith the output ring gear 32. The forward rotational tendency of the planet carrier 30 is resisted by the reverse brake 40.

From the foregoing it will be appreciated that a minimum of gears afford four forward drive ratios including an overdrive and a reverse drive ratio. This is possible because of the dual use made of certain ones of the gears, e.g. the reaction sun gear 34 serves as an input gear in reverse drive and as a reaction gear in forward drive. Then too, the unique arrangement of gearing requires, except for the overdrive, that only one drive sustaining device be rendered operative as the transmission goes from one drive ratio to another. This reduces the need for a complex control system to gain the proper timing of engagements and disengagements as is usually required when two or more drive sustaining devices are involved in a given ratio change.

The invention is to be limited only by the following claims.

What is claimed is:

1. In a transmission, the combination of a power source, a hydrodynamic torque transmitting device drive connected to the power source, a planet carrier having first and second intermeshing planet pinions revolvably supported thereon, an output ring gear meshing with the second planet pinion and connected to a load, a reaction sun gear also meshing with the second planet pinion, an input sun gear meshing with the first planet pinion, clutch means operative to drive connect the input sun gear to the hydrodynamic torque transmitting device, a one-way brake preventing rotation of the planet carrier in one direction so that with the clutch means operative a forward low speed drive ratio is provided, a forward drive brake operative for holding the reaction sun gear so that with the clutch means still operative a forward intermediate speed drive ratio is provided, a clutch operative for directly connecting the planet carrier to the power source so that with the clutch means also operative a direct drive ratio is provided with part of the drive proceeding through the hydrodynamic torque transmitting device and the other part of the drive proceeding directly from the power source and with both the forward drive brake and the clutch operative an overdrive ratio is provided with all of the drive bypassing the hydrodynamic torque transmitting device and proceeding directly from the power source to the planet carrier.

2. In a transmission, the combination of a power source, a hydrodynamic torque transmitting device drive connected to the power source, a planet carrier having first and second intermeshing planet pinions revolvably supported thereon, an output gear meshing with the second planet pinion and connected to a load, a reaction gear also meshing with the second planet pinion, an input gear meshing with the first planet pinion, clutch means operative to drive connect the input gear to the hydrodynamic torque transmitting device, brake means preventing rotation of the reaction gear in one direction so that with the clutch means operative a forward low speed drive ratio is provided, a forward drive brake operative for holding the reaction gear so that with the clutch means still operative a forward intermediate speed drive ratio is provided, and a clutch operative for directly connecting the power source to the planet carrier so that with the clutch means operative a direct drive ratio is provided with part of the power being transferred through the hydrodynamic torque transmitting device and the other part of the power being transferred through the clutch and with both the forward drive brake and the clutch operative an overdrive ratio is provided in which all of the power from the source bypasses the hydrodynamic torque transmitting device and proceeds directly to the planet carrier.

3. In a transmission, the combination of a power source, a hydrodynamic torque transmitting device drive connected to the power source, a planet carrier having first and second intermeshing planet pinions revolvably supported thereon, an output gear meshing with the second planet pinion and connected to a load, a reaction gear also meshing with the second planet pinion, an input gear meshing with the first planet pinion, clutch means operative to drive connect the input gear to the hydrodynamic torque transmitting device, brake means operative when the clutch means is operative to prevent rotation of the planet carrier so as to provide a forward low speed drive ratio and to hold the reaction gear so as to provide a forward intermediate speed drive ratio, and a clutch operative for directly connecting the planet carrier to the power source so that with the clutch means operative part of the power is transferred through the hydrodynamic torque transmitting device and part through the clutch so as to provide a split torque direct drive ratio with both the clutch operative and the brake means operative to hold the reaction gear, an overdrive ratio is provided in which all of the power from the source bypasses the hydrodynamic torque transmitting device and proceeds directly to the planet carrier.

4. In a transmission, the combination of a power source, a hydrodynamic torque transmitting device drive connected to the power source, a planet carrier having first and second intermeshing planet pinions revolvably supported thereon, an output gear meshing with the second planet pinion and connected to a load, a reaction gear also meshing with the second planet pinion, an input gear meshing with the first planet pinion, clutch means operative to drive connect the input gear to the hydrodynamic torque transmitting device, brake means operative to restrain rotation of the reaction gear, and a clutch operative for directly connecting the planet carrier to the power source so that with the clutch means also operative part of the power is transferred thtrough the hydrodynamic torque transmitting device and part through the clutch so as to provide a split torque direct drive ratio and with both the brake means and the clutch operative, an overdrive ratio is provided in which all of the power bypasses the hydrodynamic torque transmitting device and proceeds directly from the source to the planet carrier.

References Cited by the Examiner

UNITED STATES PATENTS

| | | | |
|---|---|---|---|
| 2,368,801 | 2/1945 | Carnugua et al. | 74—763 X |
| 2,725,762 | 12/1955 | Hettinger et al. | 74—688 |
| 2,862,403 | 12/1958 | Miller | 74—763 |
| 2,873,621 | 2/1959 | Simpson | 74—688 |
| 2,897,689 | 8/1959 | Waclawek | 74—688 |
| 2,940,336 | 6/1960 | Simpson et al. | 74—677 X |
| 3,048,057 | 8/1962 | Dodge | 74—677 |
| 3,106,107 | 10/1963 | Hardy | 74—763 X |
| 3,162,063 | 12/1964 | Konrad | 74—763 X |
| 3,188,886 | 6/1965 | Jandasek | 74—688 |
| 3,237,482 | 3/1966 | General et al. | 74—688 |

FOREIGN PATENTS 929,571   12/1947   France.

DAVID J. WILLIAMOWSKY, *Primary Examiner.*

J. R. BENEFIEL, *Assistant Examiner.*

UNITED STATES PATENT OFFICE
CERTIFICATE OF CORRECTION

Patent No. 3,314,307                      April 18, 1967

Earl L. Egbert

It is hereby certified that error appears in the above numbered patent requiring correction and that the said Letters Patent should read as corrected below.

Column 1, line 42, for "denotes" read -- denote --; line 6 strike out "and", first occurrence; column 2, line 1, for "jointed" read -- joined --; line 33, after "short" insert -- planet --; column 4, line 55, for "gear," read -- gear --; line 72, for "thtrough" read -- through --; column 5, line 1, for "operative," read -- operative --; line 8, for "Carnugua et al. read -- Carnagua et al. --.

Signed and sealed this 14th day of November 1967.

(SEAL)
Attest:

Edward M. Fletcher, Jr.                     EDWARD J. BRENNER
Attesting Officer                             Commissioner of Patents